United States Patent

Pichal

[15] 3,676,785

[45] July 11, 1972

[54] HIGH GAIN, ULTRA LINEAR DETECTOR FOR FREQUENCY MODULATION

[72] Inventor: Henri T. Pichal, St. Petersburg, Fla.

[73] Assignee: Honeywell Information Systems Inc., Waltham, Mass.

[22] Filed: Dec. 10, 1970

[21] Appl. No.: 96,802

[52] U.S. Cl. ..............................329/103, 307/251, 329/119, 330/35

[51] Int. Cl. ..............................H03d 3/14

[58] Field of Search..................329/103, 117, 119, 140, 141, 329/142, 143; 307/251; 330/35

[56] References Cited

UNITED STATES PATENTS

| | | | |
|---|---|---|---|
| 3,348,062 | 10/1967 | Carlson et al. | 329/119 X |
| 3,290,613 | 12/1966 | Theriault | 307/251 X |
| 3,299,281 | 1/1967 | Cluwen | 329/103 X |
| 3,371,290 | 2/1968 | Kibler | 330/35 X |
| 3,525,050 | 8/1970 | Wolf et al. | 330/35 X |

*Primary Examiner*—Alfred L. Brody
*Attorney*—Ronald T. Reiling and Fred Jacob

[57] ABSTRACT

A detector for providing quadrature detection of frequency modulated signals is disclosed. An FET (Field Effect Transistor) device having two gates, a source and a drain, has one gate coupled to the frequency modulated incoming signal and the other gate coupled through a 90° phase shifter to the incoming signal. The demodulated signal appears at the drain electrode of the FET.

11 Claims, 9 Drawing Figures

Patented July 11, 1972 3,676,785

3 Sheets-Sheet 1

INVENTOR.
HENRI T. PICHAL
BY Nicholas Prasinos
ATTORNEY

INVENTOR.
HENRI T. PICHAL
BY Nicholas Prasinos
ATTORNEY

INVENTOR.
HENRI T. PICHAL
BY Nicholas Prasinos
ATTORNEY

HIGH GAIN, ULTRA LINEAR DETECTOR FOR FREQUENCY MODULATION

BACKGROUND OF THE INVENTION

The field of the invention is generally frequency demodulators/discriminators, and more particularly discriminators involving two scalar potentials.

Prior art discriminators are described generally in F. E. Terman's, Radio Engineers Handbook (First edition 1943, pages 578 to 588).

The purpose of the discriminator in a frequency modulator receiver is to derive the audio variations from the different incoming frequencies. Hence, the discriminator circuit must develop voltages proportional to the deviation of the various incoming frequencies about the carrier frequency. Although there are various prior art devices that perform this function such as the Foster-Seely, Travis, Crosby, Ratio detectors, gated beam detectors and Product detectors, they can be generally classified into two major types — one type involving three scalar values of potential, and another type involving two scalar values of potential. FIG. 1 shows one type involving three scaler values of potential. A tank circuit 100 comprised of a series-coupled capacitor 2 to an inductor 3 is inductively coupled to tank circuits 101 and 102. Tank circuit 101 is comprised of series-coupled inductor 4 and capacitor 5, and tank circuit 102 is comprised of series-coupled inductor 6 and capacitor 7. Tank circuit 101 is coupled electronically to the plate of vacuum tube diode 8, whereas tank circuit 102 is electronically coupled to the plate of vacuum tube diode 9. Each tube has its own load resistor, for example, tube 8 is coupled to resistor 11 and tube 9 is coupled to resistor 13; the resultant output of the entire discriminator is obtained from the resultant voltage across both resistors 11 and 13 at the output terminals 14 and 15.

Tank Circuit 100 is inductively coupled to both tank circuits 101 and 102. Tank Circuit 101 is resonant at some frequency 204 (see FIG. 2) below the carrier frequency 203, whereas tank circuit 102 is resonant at some frequency 205 (see FIG. 2) above the carrier frequency. However, the load resistors 11 and 13 have such a polarity so that the voltages developed across them oppose each other, hence, the overall response curve for the discriminator shown on FIG. 2 shows resonant curve 202 in opposite phase to resonant curve 201. The overall result of these curves is the familiar S-curve. It can be readily observed from FIG. 2 that any frequency variation is readily converted to a voltage output when Tank Circuits 101 and 102 are properly tuned somewhat above and below the carrier frequency 203. The S-curve in this instance was derived by the vectorial addition of three quantities — the carrier frequency and out-of-phase frequencies above and below the carrier frequency.

It is also known how to achieve FM demodulation (or achieve an S-curve similar to FIG. 3) by the vectorial addition of only two AC signals, where one signal is a constant frequency source such as an oscillator and has a quadrature relationship with the information carrying signal. Such a demodulator is the product detector or gated beam FM demodulator. The serious drawback to the gated beam detector is that it will only operate for signals having small deviation and bandwidth requirements, and suffers from variations in sensitivity and gain over wide temperature operating conditions.

From the foregoing discussion, it is apparent that prior art FM demodulators require, generally, duplicate circuits having duplicate components and/or have limited operational bandwidths.

It is an object of the invention to provide an improved solid state FM demodulator/discriminator.

It is another object of the invention to reduce the number of components in the discriminator circuit.

It is still another object of the invention to provide a discriminator which has an extremely linear S-curve and capable of operation at very high frequencies.

It is still a further object of the invention to provide essentially constant sensitivity and gain over wide temperatures — e.g., in the order of 12 percent change from −65° C to +125° C.

SUMMARY OF THE INVENTION

The foregoing objects of the instant invention are attained by providing an FM discriminator/demodulator circuit which makes use of an FET (Field Effect Transistor) device having a source and drain and two gates; one gate is coupled to a first tank circuit for introducing the FM input signal therein, whereas the second gate is coupled to a quadrature tank circuit. The two tank circuits are in turn coupled capacitively for introducing a 90° phase shift through the quadrature tank circuit. The audio video appears and is abstracted from the drain circuit.

A feature of the invention is the reduction of the number of components required for the circuit.

Another feature of the invention is that the S-curve is extremely linear and hence the discriminator is operable to very high frequencies.

Still another feature of the invention is that it eliminates the need for at least one stage of amplification by virtue of the transconductance that the FET provides at the demodulated frequencies.

Yet another feature of the invention is its wide range of operational bandwidths.

BRIEF DESCRIPTION OF THE DRAWINGS

Other features and advantages of the invention will become obvious from a consideration of the following description and the claims taken together with the accompanying drawings wherein:

DETAILED DESCRIPTION OF THE INVENTION

Figure 4:
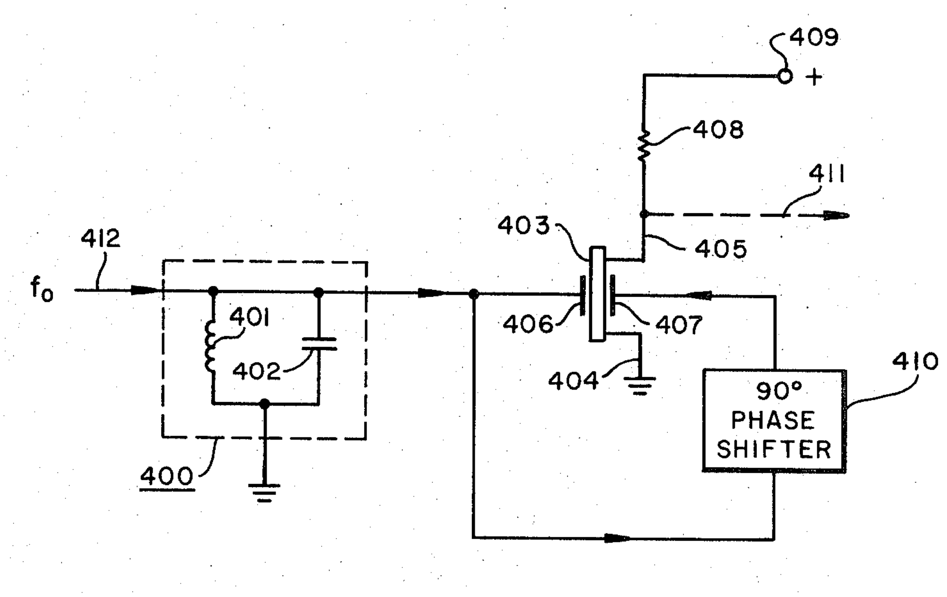
FIG. 4 is a schematic and block diagram of one embodiment of the invention.

Referring to FIG. 4, a two gate FET device 403 (typically such as a Motorola 3N124/5/6) has one gate 406 coupled to a tank circuit 400 which in turn is comprised of an inductor 401 and capacitor 402 connected in in series. Gate 407 of FET device 403 is coupled to a 90° phase shifter 410 which is also coupled to the output of tank circuit 400. The source 404 of FET device 403 is coupled to ground, the the drain 405 of FET device 403 is coupled to a positive terminal 409 through resistor 408. The output voltage of the discriminator is obtained at output 411. An incoming FM modulated signal with carrier frequency $f_o$ is introduced to tank circuit 400 at 412. If the incoming FM modulated signal has a value $E_1$ at Gate 406, then the 90° phase shifter will provide a signal $E_2$, 90° out-of-phase with $E_1$ at gate 407. (See FIG. 7A.) A resultant signal $E_{at}$ equal to $\sqrt{2}\,E$ will appear at the output 411 which is 45° out-of-phase with $E_1$ or $E_2$. Various frequencies above or below the carrier frequency will produce at the output 411 a resultant vector having various magnitudes and phase angles from the carrier frequency vector. For example, referring to FIG. 7A we have the case where the frequency of the signal $E_2$ is equal to the center frequency of the discriminator $E_1$; the vector sums of $E_1$ plus $E_2$ equals $E_{at}$ equals $\sqrt{2}\,E$. In FIG. 7B, it is assumed that the frequency of the signal $E_2$ is less than the center frequency of the discriminator by an amount sufficient to make $E_1$ equal to E at an angle of 60°. Under these conditions, the vector sum $E_1$ plus $E_2$ equals $E_{at}$ equals $\sqrt{3}$ E at an angle of 30°. In FIG. 7C, it is assumed that the frequency of the $E_2$ signal is greater than the center frequency of the discriminator by an amount sufficient to make $E_1$ equal to E at an angle of 120°; the vector sum of $E_1$ plus $E_2$ equals $E_{at}$ equals E at an angle of 60°. (Although in FIGS. 7A and 7C the magnitude of vectors $E_1$ and $E_2$ is shown equal, this is not necessary to the proper operation of the discriminator.)

Figure 5:
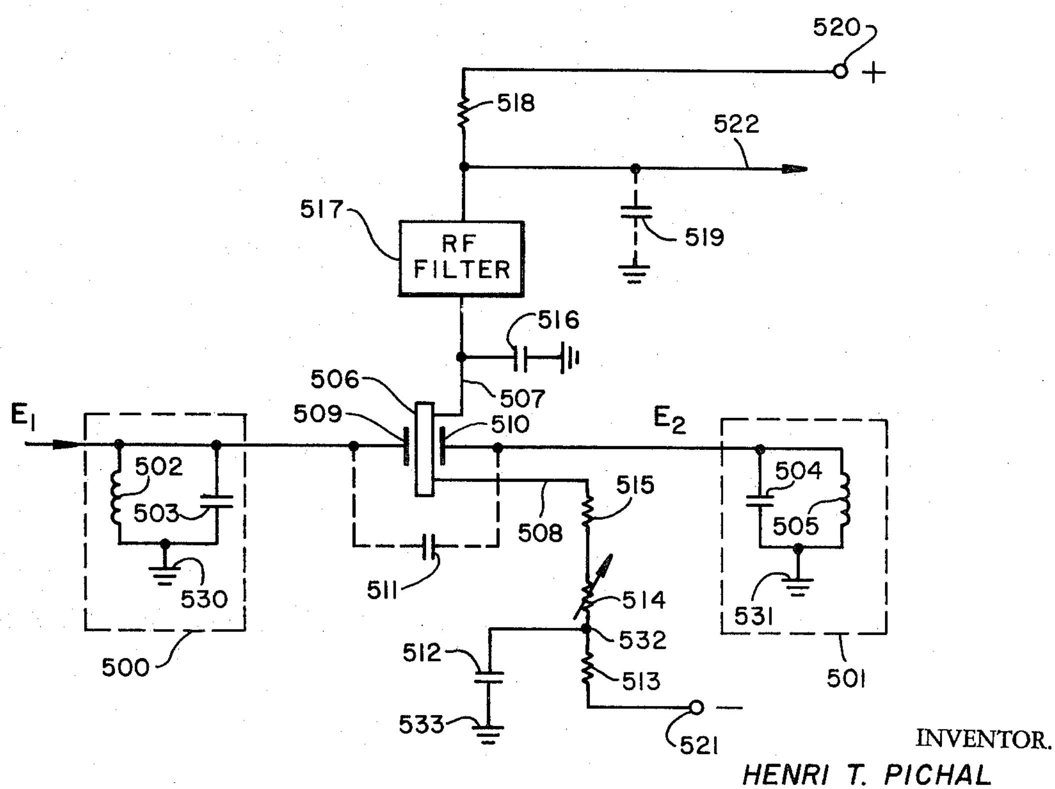
FIG. 5 is a schematic and block diagram of another embodiment of the invention.

Referring now of FIG. 5, an FET device, typical of the Motorola 3N124/5/6, has one of its gates 509 coupled to a tank circuit 500 which tank circuit is comprised of inductor 502 and capacitor 503 coupled in series with each other. The other end of the tank circuit 500 is coupled to ground 530. Gate 510 of the FET device is coupled to one end of another tank circuit 501 comprised of an inductor 505 and a capacitor 504 coupled in series to each other. The other end of the tank circuit 501 is coupled to ground 531. The two gates and tank circuits are coupled to each other by an external capacitor 511; however, the internal capacitance of FET device may be utilized to couple the gates and tank circuits together. (Tank circuit 500 is not absolutely required because an incoming signal may be introduced directly through one gate from a prior stage limiter (not shown)). The external capacitor 511 (or internal capacitance of the FET device if this mode of coupling is used) provides a 90° phase shift at carrier frequency. Depending on the bandwidth of the incoming signal the amount of capacitance required is that capacitance necessary to provide a $Q_k$ factor up to unity wherein $Q_k = X/R$ and is a quality factor, and wherein X is reactance at resonance and R is the resistance of the resonant circuit. Tank circuit 501 is resonant at the nominal carrier frequency for $E_1$ but is 90° out-of-phase with $E_1$. A negative DC potential is applied at terminal 521 to the source 508 of the FET device 506, through series resistors 513, 514 and 515. Typical values for these resistors are as follows: resistor 513 may have a value of 56 kilohms; resistor 514 may have a value of 5 kilohms; resistor 515 may have a value of 4.7 kilohms. The value of the sum of resistances 514 and 515 may be adjusted by means of variable resistor 514 to provide:

a. Symmetry of "S-curve" (IF response);

b. Final optimization of linearity by establishing the correct order of demodulated feedback to both gate 509 and 510.

Figure 1:
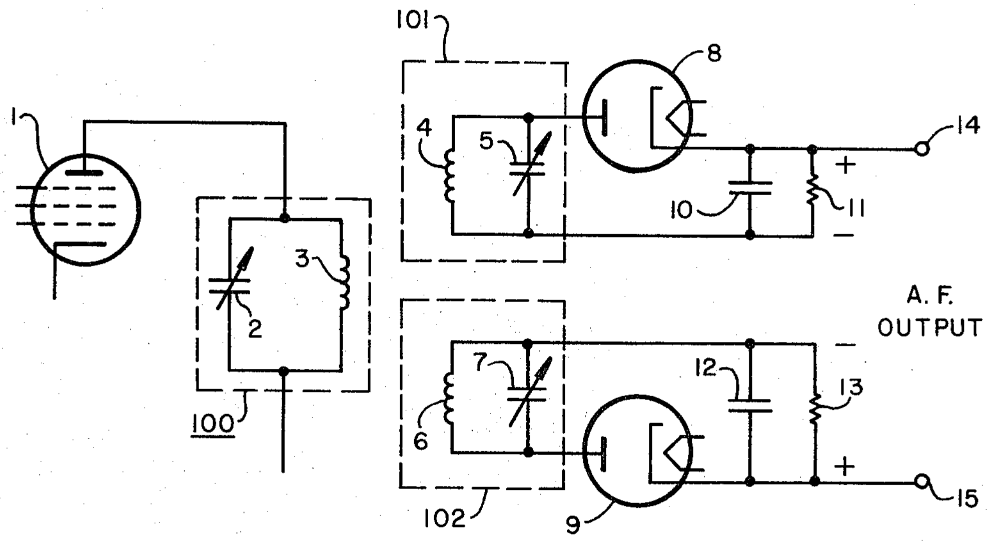
FIG. 1 PRIOR ART
FIG. 1 is a schematic diagram of a prior art FM discriminator/modulator.
Figure 6:
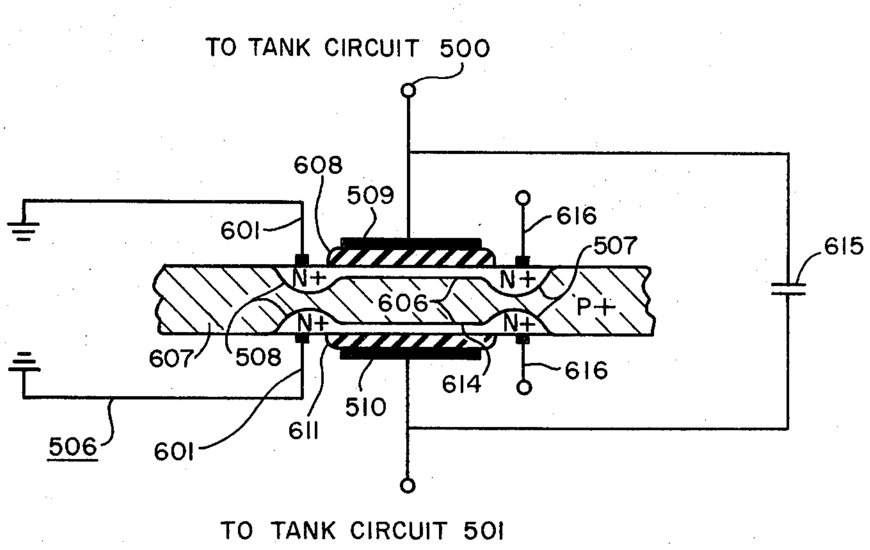
FIG. 6 PRIOR ART
FIG. 6 is a schematic in cross-section (not to scale) of a prior art FET device having two gates.
Figure 2:
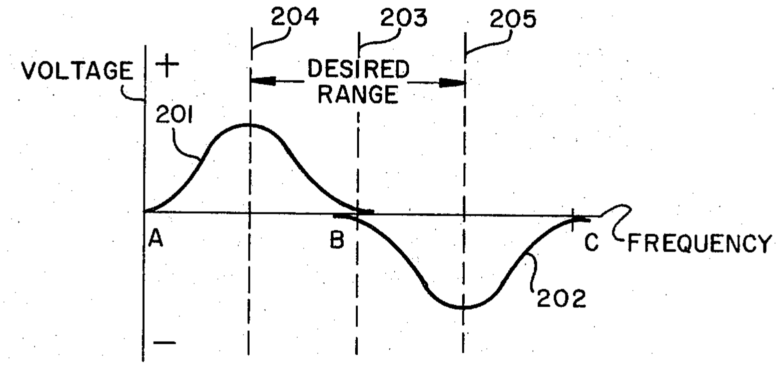
FIG. 2 is a graph useful in explaining the principle of operation of a discriminator.
Figure 3:
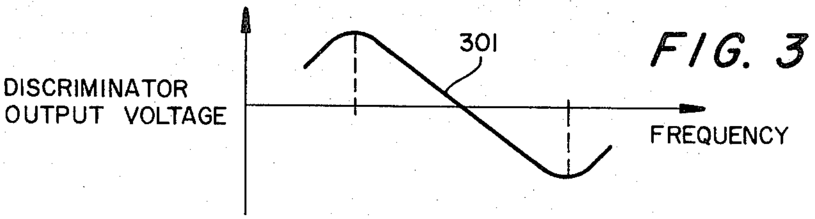
FIG. 3 is a graph showing a resultant S-curve typical of FM discriminators.

Capacitor 512 is parallel coupled to the source 508 at the junction 532 of series coupled resistors 513, 514 and 515; the other end of capacitor 512 is coupled to ground at 533. The capacitance reactance of capacitor 512 is 0 at resonant frequency. The purpose of the capacitor 512 is to provide a by-pass to ground to any high frequency currents that may find themselves in the source circuit. Positive DC potential is introduced to the drain 507 of FET device 506 at terminal 520, through series resistor 518 and through the RF filter network 517. A typical value of resistor 510 is 47 kilohms. The demodulated output signal is abstracted from line 522. Referring to FIG. 6, a detailed (not to scale) representation in cross-section of a prior art FET device typical of the type used in the invention is shown. A semi-conductor material 607 such as silicon or germanium with either a P+ or N+ dopant (in this case P+ is utilized as a dopant) has an N+ source 508 and an N+ drain 507 diffused in the body of the semi-conductor. The ohmic contacts 509 and 510 form the gates spatially separated from the semi-conductor materials 607 by insulating oxide-layers 608 and 611. Ohmic contacts 601 provide for external connection to the source 508 while ohmic contacts 616 provide for external electrical connection to the drain 507. Capacitor 615 provides external coupling for the gates 509 and 510. It will also be observed that the gates 509 and 510 and the channel 606 on either side of the semi-conductors 607 separated by the P+ semi-conductor material, may act as a capacitor and under the proper circumstances may act as an internal coupling capacitor.

A complete description of MOS-FET devices is found in a book by Richman entitled Characteristics and Operation of MOS Field-Effect Devices, published by McGraw-Hill. For the purposes of understanding the instant invention, however, a less detailed explanation is given. Under normal operating conditions the drain 507 is generally reversed biased and the source 508 is generally forward biased. This is illustrated schematically for an N-channel unit in FIG. 5 which shows a minus voltage applied to terminal 521 cause a plus voltage to terminal 520. When the voltage is applied to the gates 509 and 510 an inversion layer or channel 606 forms between a source and drain in the normally P type material; the width of this channel depends on several factors such as the resistivity in that area of the P material, the geometry of the gates, source and drain; and also in the magnitude of the voltage applied. As the voltage is varied, other conditions being constant, the channel will become wider or narrower as the voltage is increased or decreased respectively. (See characteristics and operation of MOS-FET devices by Richman, pages 1 thru 7). This variation of the channel with voltage permits more or less electrons to pass from the source to the drain and thus, the drain to source resistance varies with the application of gate voltage. Thus, we have a means to modulate the drain current by applying the modulation voltage to the gate. In this device, unlike bi-polar semi-conductor devices the conduction mechanism from source to drain is by majority carriers and, hence, relatively insensitive to temperature variations as compared to the bi-polar minority carrier devices. (See page 79 of the above mentioned Richman book.)

Figure 7A:
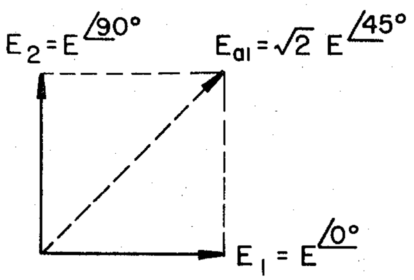
FIGS. 7A, 7B and 7C are vector representations of different operating conditions of the invention useful in explaining the operation of the invention.
Figure 7B:
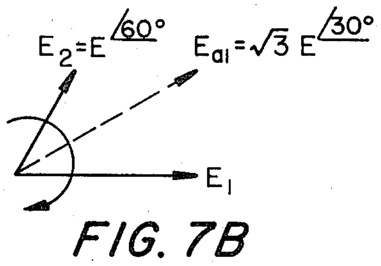
Figure 7C:
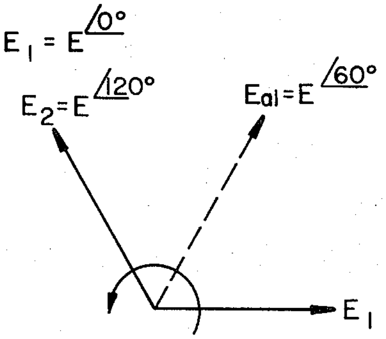

Although the operation of the instant invention is not exactly understood, a reasonable explanation is as follows:

Referring to FIGS. 5, 6, 7A, 7B and 7C, it will be seen that if a voltage $E_1$ is applied to gate 509 and a voltage $E_2$ is applied to gate 510 the width of the FET channel is being varied in cross-sectional area at a rate and an amplitude depending on the instanteous values derived for $E_{at}$ in FIGS. 7A, 7B and 7C. Because the rate of which $E_{at}$ varies is a function of the FM deviation rate in the original signal $E_1$, then the effect of the variations of cross-sectional channel area due to the variation of the depletion region caused by the composite field effects of gates 509 and 510 therefore causes instanteous drain current to vary. Hence, FM modulation information in an FM modulated carrier — frequency is converted to an amplitude modulated drain current.

These and other variations of the embodiment of the invention will become apparent to those skilled in the art upon the reading of the foregoing specification when taken together with the drawings and claims.

What is claimed is:

1. A solid state detector for detecting frequency modulated electromagnetic wave signals comprising:

a. a first tank circuit means;

b. a second tank circuit means;

c. an FET (Field Effect Transistor) device having a source and a drain and a first and second gate, with said first tank circuit means coupled to said first gate and said second tank circuit means coupled to said second gate;

d. biasing means coupled to said FET device for providing bias to said FET device;

e. phase delay means coupled to said first and second tank circuit means for introducing a phase difference between signals in said first and second tank circuit means;

f. and input and output means coupled to said FET device for introducing and abstracting electric signals to and from said detector.

2. A solid state detector as recited in claim 1 wherein said phase delay means is an external capacitor.

3. A solid state detector as recited in claim 2 wherein said capacitor has a capacitance sufficient to provide $Q_k$ factor up to unity where:

$$Q_k = x/R$$

x = reactance at resonance

R = resistance at resonance.

4. A solid state detector as recited in claim 1 wherein said delay means introduces a phase difference of substantially 90° between signals in said first and second tank circuit means.

5. A solid state detector as recited in claim 1 wherein said phase delay means comprises capacitance means internal to said FET device.

6. A solid state detector as recited in claim 1 including biasing means coupled to said source and drain of said FET device.

7. A solid state detector as recited in claim 1 wherein said drain is positively biased and said source is negatively biased.

8. A method of detecting frequency modulated electromagnetic wave signals, comprised of a carrier frequency and audio frequency electromagnetic waves, comprising the steps of:

a. imparting a phase shift to the frequency modulated electromagnetic wave signals;

b. converting the frequency modulated electromagnetic wave signals into first voltage variable electric signals and converting the phase shifted frequency modulated electromagnetic wave signals into second voltage variable signals said first and second voltage variable signals responsive to frequencies above and below the center frequency of the carrier frequency respectively;

c. introducing the voltage variable electric signals into a FET (Field Effect Transistor device; and, d. abstracting the audio voltage variable electromagnetic wave signals from said FET device.

9. A method of detecting frequency modulated electromagnetic wave signals as recited in claim 8 wherein the phase imparted to the audio frequency electromagnetic wave signals relative to the carrier frequency electromagnetic signals is 90°.

10. A method of detecting frequency modulated electromagnetic wave signals comprised of a carrier frequency and audio frequency electric wave signals comprising the steps of:

a. converting the frequency modulated electromagnetic wave signals having frequencies below the center frequency of the carrier wave into first voltage variable signals responsive to the frequencies below the carrier frequency;

b. introducing a phase shift to the frequency modulated electromagnetic wave signals;

c. converting the phase shifted frequency modulated electromagnetic wave signals having frequencies above the center frequency of the carrier wave into second voltage variable signals responsive to the frequencies above the carrier frequency;

d. applying the first and second voltage variable signals to a FET device;

e. and abstracting the audio voltage variable electromagnetic wave signals from said FET device.

11. A solid state detector for detecting frequency modulated electromagnetic wave in (FM) signals comprising:

a. an FET (Field Effect Transistor) device having a source and a drain and a first and second gate;

b. input means coupled to said FET device, said input means for applying electronic signals to said FET device;

c. quadrature tank circuit means coupled to said FET device and to said input means said quadrature tank circuit means for converting the FM signal to phase delayed voltage variable signals;

d. bias means coupled to said FET device for providing bias to said FET device; and, e. output means coupled to said FET device for abstracting electric signals from said detector.

* * * * *